(12) United States Patent
Halmos

(10) Patent No.: US 6,522,396 B1
(45) Date of Patent: Feb. 18, 2003

(54) DUAL MODE ADAPTIVE THRESHOLD ARCHITECTURE FOR 3-D LADAR FPA

(75) Inventor: Maurice J. Halmos, Encino, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/040,214

(22) Filed: Jan. 8, 2002

(51) Int. Cl.[7] .............................. G01C 3/08; G01C 1/00; G01B 11/26; G06K 9/00
(52) U.S. Cl. ..................... 356/5.01; 356/141.1; 382/106
(58) Field of Search ............................... 356/4.01–5.15, 356/141.1; 382/103, 106

(56) References Cited

U.S. PATENT DOCUMENTS

| | | | | |
|---|---|---|---|---|
| 4,992,675 A | * | 2/1991 | Conner et al. | 327/72 |
| 5,298,905 A | * | 3/1994 | Dahl | 342/54 |
| 5,870,180 A | * | 2/1999 | Wangler | 356/4.01 |
| 6,323,941 B1 | * | 11/2001 | Evans et al. | 356/4.01 |
| 6,384,414 B1 | * | 5/2002 | Fisher et al. | 250/339.14 |
| 6,392,747 B1 | * | 5/2002 | Allen et al. | 356/141.1 |

* cited by examiner

Primary Examiner—Thomas H. Tarcza
Assistant Examiner—Brian Andrea
(74) Attorney, Agent, or Firm—Colin M. Raufer; Leonard A. Alkov; Glenn H. Lenzen, Jr.

(57) ABSTRACT

An integrated detector and signal processor (31) for ladar focal plane arrays (30) which internally compensates for variations in detector gain, noise, and aerosol backscatter. The invention (31) is comprised of a detector element (42) for receiving an input signal, a circuit (72) for generating a threshold based on the RMS noise level of the input signal, and a circuit (74) determining when the input signal is above that threshold. The detector element (42) is physically located in the interior of the detector array (30), while the signal processing circuitry (50) is located on the periphery of the array (30). In the preferred embodiment, the signal processor (31) also includes a circuit (56) for sampling the input signal and a circuit (58) storing multiple samples, allowing for multiple returns to be detected. In the preferred embodiment, the signal processor (31) can be operated in two modes: self triggered and externally triggered (range-gate mode). In the self triggered mode, the detector continually monitors and samples the incoming signal until a return is detected (by the thresholding circuit). In the range-gate mode, the detector stops sampling when it receives a signal from an external source. Once the data has been acquired, readout electronics (66) output the stored samples along with the stored "stopped" time code to an external computer (26).

17 Claims, 2 Drawing Sheets

DUAL MODE ADAPTIVE THRESHOLD ARCHITECTURE FOR 3-D LADAR FPA

CROSS-REFERENCE TO RELATED APPLICATIONS

This application relates to U.S. patent applications Ser. Nos. 09/330,953 and 09/574,123 entitled METHOD AND DEVICE FOR IDENTIFYING AN OBJECT AND DETERMINING ITS LOCATION, filed Jun. 11, 1999 by J. Allen and K. McCormack and A UNIT CELL FAN-OUT APPROACH FOR LARGE FOCAL PLANE ARRAY READOUTS, filed May 18, 2000 by L. F. Linder and A. E. Reamon.

BACKGROUND OF THE INVENTION

1. Field of the Invention

The present invention relates to imaging systems. More specifically, the present invention relates to threshold architecture for ladar systems.

2. Description of the Related Art

A ladar (Laser Detecting and Ranging) system is an electro-optical system for object detection and ranging using a laser as an illuminator and a receiver which detects the return (reflection) of the laser from an object or target and converts the time of the return to range. This is done over two dimensions for a three dimensional range map. Up to now, most ladar systems have been of the scanning variety and are referred to as scanning ladar systems. In this type of ladar, a laser is pulsed at a high rate with one pulse per pixel (image element) or portion of the target area to be studied. The laser is scanned such that each pixel in the field of view is illuminated and detected. Each laser pulse may be reflected from the target area and received by a detector at the ladar site. The detector includes a signal processor to determine when the detector signal is noise and when a reflected laser pulse (return) has been detected. This can be accomplished by setting a threshold level such that anything below the threshold is considered noise and anything above it is considered a return. The detector and the laser are scanned congruently so that the detector is positioned to receive any reflected laser beams from the most recent laser pulse. After the entire target area has been scanned, the ladar system has enough information to determine the approximate range to any object within the target area and the approximate shape of any detected object.

Scannerless ladar, or flash ladar, is the next big step in radar technology. A flash ladar system illuminates the entire object plane with a single, large pulse from the laser. This laser pulse is then reflected from any object within the target area. The reflected laser pulse is received by a focal plane array (FPA), a two dimensional array of several detectors placed in the focal plane of the receiver optics. Flash ladar has the potential to dramatically increase the image frame rate over scanning systems while eliminating bulky and expensive mechanical moving parts.

One problem with flash ladar has to do with the need to compensate for variations in detector gain, noise, and atmospheric feedback. There is no guarantee that every detector on the array is going to be exactly the same. In fact, it is more likely that each detector will have a slightly different gain and bias. Some areas of the array may be more noisy than others, resulting in varying noise levels. This problem is particularly prevalent with advanced detector arrays such as the APD (avalanche photo diode). Individual bias adjustment of each detector in the array is required to provide detector-to-detector gain uniformity and to optimize the signal to noise performance for the detector.

Handling bias adjustment internally in the detector signal processor requires more complex signal processing than current detector readout electronics can handle. Readout electronics have been limited to simple signal processing due to the requirement of maintaining signal processing circuitry inside the unit cell. The alternative is to have an individual control line to each cell, but this becomes a problem for large arrays. In an FPA with 3000 cells, each control line translates to 3000 connections. A key to having an integrated signal processor unit cell is to have flexibility without having many individual control lines.

Hence, a need exists in the art for an efficient system and method for individual bias adjustment of detectors in a large ladar focal plane array.

SUMMARY OF THE INVENTION

The need in the art is addressed by the present invention, which provides an integrated detector and signal processor for ladar focal plane arrays which internally compensates for variations in detector gain, noise, and aerosol backscatter. The invention is comprised of a detector element for receiving an input signal and a circuit for generating a threshold based on the RMS noise level of the input signal and determining when the input signal is above that threshold. The detector element is physically located in the interior of the detector array, while the signal processing circuitry is located on the periphery of the array. In the preferred embodiment, the signal processor also includes a circuit for sampling the input signal and storing multiple samples, allowing for multiple returns to be detected. In the preferred embodiment, the signal processor can be operated in two modes: self triggered and externally triggered (range-gate mode). In the self triggered mode, the detector continually monitors and samples the incoming signal until a return is detected (by the thresholding circuit). In the range-gate mode, the detector stops sampling when it receives a signal from an external source. Once the data has been acquired, readout electronics output the stored samples along with the stored "stopped" time code to an external computer.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention is an integrated signal processor for a detector in a focal plane array which internally compensates for variations in detector gain, noise, and aerosol backscatter. This invention is designed for use in a flash ladar system such as that described in U.S. patent application Ser. No. 09/330,953 entitled METHOD AND DEVICE FOR IDENTIFYING AN OBJECT AND DETERMINING ITS LOCATION, filed June 11, 1999 by J. Allen and K. McCormack the teachings of which are incorporated by reference herein.

Figure 1:
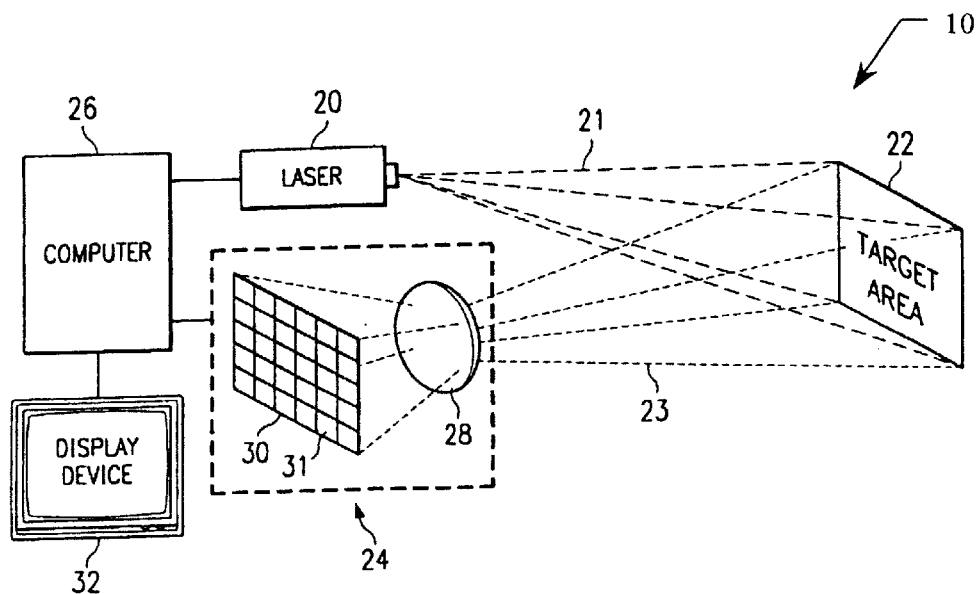
FIG. 1 is block diagram of a flash ladar system.

FIG. 1 is block diagram of a flash ladar system 10. A laser 20 emits a pulse of laser light 21 which illuminates an entire target area 22. Any object within the target area 22 will reflect the laser pulse back to a receiver 24 co-located with the laser 20. When the laser 20 emits a pulse of laser light 21, it sends a signal to a computer 26 which then notifies the receiver 24 that the laser 20 has just illuminated the target area 22. The purpose of this notification is so that the duration of time required for the pulse of laser light 21 to leave the laser 20, reflect off an object in the target area 22, and return to the receiver 24 can be recorded. This time duration can then be converted into range and location information by the computer 26. This information can then be displayed on a display device 32.

Since flash ladar systems illuminate the entire target area, an array of detectors is necessary in order to capture reflections from the entire target area. Therefore, the receiver 24 consists of a lens 28 which focuses the reflected laser beam 23 onto a detector array 30. The detector array 30 consists of multiple detectors 31. Each detector 31 includes a detector element and a signal processor.

Figure 2:
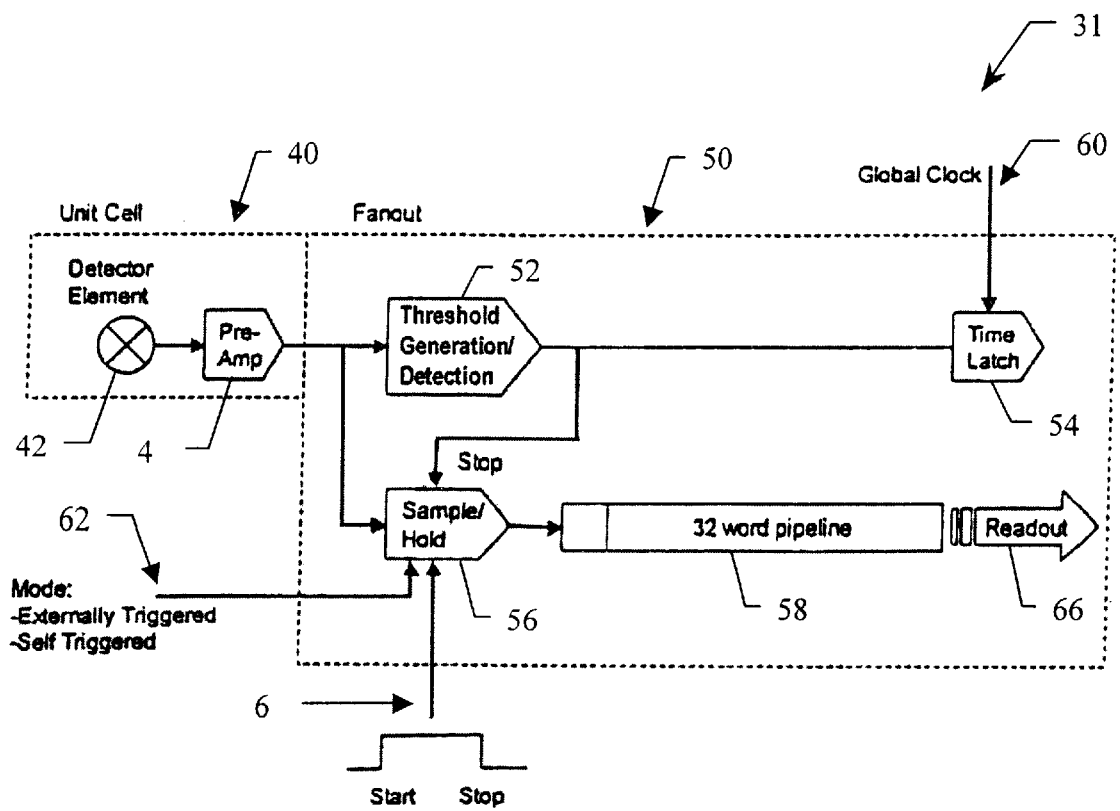
FIG. 2 is a block diagram of detector and its associated signal processing circuitry designed in accordance with the teachings of the present invention.

FIG. 2 is a block diagram of detector and its associated signal processing circuitry 31 designed in accordance with the teachings of the present invention. Each detector and its signal processing circuitry is comprised of a unit cell 40 and a fanout 50. A detector element 42 and preamplifier 44 are in the unit cell 40 and the rest of the signal processing electronics are in the fanout 50. The unit cells 40 are physically located in the interior of the detector array, while the fanouts 50 are located on the periphery of the array.

Previously, readout electronics was limited to simple signal processing due to the requirement of maintaining signal processing circuitry inside the unit cell. By using a fanout approach, the signal processing electronics are located in the perimeter of the detector active area, allowing more space for more complex signal processing. The physical implementation of this fanout approach is discussed more fully in U.S. patent application Ser. No. 09/574,123 entitled A UNIT CELL FAN-OUT APPROACH FOR LARGE FOCAL PLANE ARRAY READOUTS, filed May 18, 2000 by L. F. Linder and A. E. Reamon the teachings of which are incorporated by reference herein.

The detector signal processor must determine when the incoming detector signal is noise and when a reflected laser pulse (return) has been detected. This can be accomplished by setting a threshold level such that anything below the threshold is considered noise and anything above it is considered a return. In accordance with the teachings of the present invention, the threshold setting is computed separately for each individual detector by the detector signal processor. The threshold setting is a function of the noise, gain, leakage currents, and aerosol backscatter. This allows the focal plane array to adapt to the operating conditions and to set optimum thresholds for a desired probability of detection or false alarm which is acceptable for the application. A typical probability of detection may be 0.99 and a probability of false alarm may be 0.01 for the entire array.

In the preferred embodiment, the signal processor stores multiple samples of the signal, allowing for multiple returns to be detected. A multiple return occurs when a secondary target exists behind a first target, an example being a vehicle behind a tree or net.

In the preferred embodiment, the signal processor can be operated in two modes: self triggered and externally triggered (range-gate mode). In the self triggered mode, the detector continually monitors and samples the incoming signal until a return is detected (threshold crossed). In certain applications, the approximate range to the target is known a priori. In this case, the signal processor can operate in an externally triggered mode where the detector signal processor simply stores the samples corresponding to that range. No thresholding is required.

In the detector and signal processor 31 of the illustrative embodiment shown in FIG. 2, the laser signal 23 is converted to an electronic current at a detector unit 42. This current is amplified and converted into a voltage by a trans-impedance preamplifier 44. The amplifier 44 resides directly under the detector cell of nominal dimensions of 25×25 $\mu$m. The output of the amplifier 44 is fanned out to the perimeter of the detector active area.

In the fanout 50, the output of the amplifier 44 is sent to a Threshold Generation and Detection Unit 52 and a Sample and Hold circuit 56. The Sample and Hold circuit 56 samples the incoming signal and stores the digitized output in a data storage pipeline 58. The data storage pipeline stores multiple samples, nominally 32, of the signal. When the pipeline 58 becomes full, as new samples come in, old ones are thrown out. This continues until a stop signal is generated either externally (when in range-gate mode) or internally (when in self triggered mode) from the Threshold Generation and Detection Unit 52. In the dual mode embodiment, the Sample and Hold circuit 56 is sent a global signal 62 which tell the circuit whether to operate in the range-gate or self triggered mode.

The Threshold Generation and Detection Unit 52 continuously monitors the incoming signal and estimates the noise level to set a threshold. The averaging time will be in the order of 1 $\mu$is. This allows the threshold to track a broad range of backscatter from fog and other aerosols, while still allowing a detection when a signal return occurs on top of it. This feature is one of the key innovations that make this processor perform beyond the state of the art. In the preferred embodiment, the threshold can be set at varying levels of sensitivity based on a global signal sent to the array. While monitoring the signal, when the voltage level exceeds the threshold setting, the Threshold Generation and Detection Unit 52 waits a predetermined number of clock cycles (nominally 30) and sends a stop signal to the Sample and Hold circuit 56 so that no more data will be pumped into the buffer. Thus, the return is captured as well as several samples following the return in order to capture any possible secondary returns. Once the buffering process is stopped, the signal processor will latch in the global digital time 60 to keep track of when the process was stopped. Each detector cell will perform this function independently of the adjacent units, hence allowing a wide range of range delays to be detected.

In the range-gate mode of operation, the Sample and Hold circuit 56 receives a stop signal 64 from an external source, which would be the same for all the cells on the array. This would be done when the range to the target is known and limited across the whole FPA.

Once the data has been acquired, the readout electronics 66 will sequentially read from each cell all 32 sampled intensities along with the stored "stopped" time code 54. The maximum repetition rate that is expected is approximately 30 Hz, so the maximum data rate that is expected will be approximately 40 Mbits/sec. The 32 intensity data point read out from each cell will be used by the computer 26 to determine the range or ranges of the detected target. For the range-gate mode, that target range can be simply determined by the data point with the highest intensity. For the self triggered mode, a centroid algorithm would be more desirable.

Figure 3:
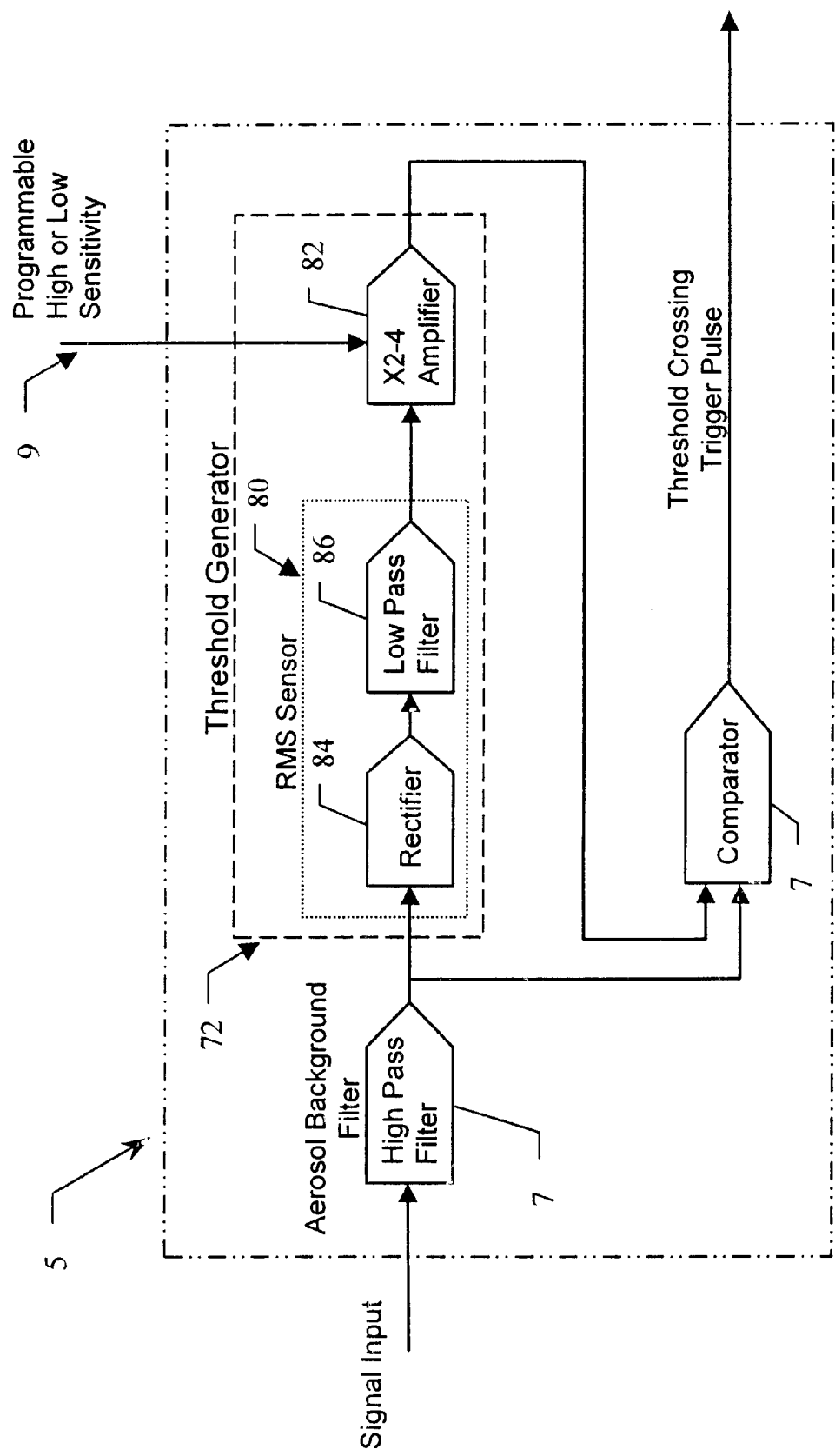
FIG. 3 is a block diagram of a threshold generation and detection unit designed in accordance with the teachings of the present invention.

FIG. 3 is a block diagram of a Threshold Generation And Detection Unit 52 designed in accordance with the teachings of the present invention. The input signal is first sent through a high pass filter 70 which acts as an aerosol background filter by removing any low frequency or dc component of the signal. The resulting ac signal is sent to a Threshold Generator 72 and a comparator 74. The Threshold Generator 72 sets the threshold level based on the noise level of the incoming signal. In the preferred embodiment, the threshold is set to a multiple, nominally 2 to 4, of the RMS (root mean square) amplitude of the ac noise. The Threshold Generator 72 is comprised of an RMS sensor 80 and an amplifier 82. The RMS sensor 80 can be implemented using a rectifier 84 followed by a low pass filter 86. The amplifier 82 multiplies the RMS noise amplitude by a predetermined number to generate the threshold level. The multiplier can be a fixed number, or can be varied to adjust for low or high sensitivity based on a global signal 90 sent to the amplifier 82.

The comparator 74 then compares the signal to the threshold level. If the signal is above the threshold setting, then the comparator 74 outputs a signal to the Sample and Hold circuit 56. If a return from the laser pulse is in the signal, then the pulse will get through the high pass filter 70 (because it has a high frequency) and go to the comparator 74, but its contribution to the RMS sensor 80 will be minimal so it doesn't affect the setting of the threshold.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention. Accordingly,

What is claimed is:

1. An integrated detector and signal processor for ladar focal plane arrays comprising:
   first means for receiving an input signal wherein said first means is located in an interior of said array;
   second means for generating an adaptive threshold setting based on a characteristic of said input signal; and
   third means for detecting when said input signal is above said threshold,
   wherein said second and third means are located on a periphery of said array.

2. The invention of claim 1 wherein said threshold is set to a multiple of the RMS (root mean square) noise amplitude of said input signal.

3. The invention of claim 2 wherein said second means includes an RMS sensor and an amplifier.

4. The invention of claim 3 wherein said RMS sensor includes a rectifier and a low pass filter.

5. The invention of claim 3 wherein said amplifier can be varied to adjust for low or high sensitivity.

6. The invention of claim 1 wherein said third means is a comparator.

7. The invention of claim 1 wherein said signal processor further includes means for storing a time code corresponding to the time when said third means detects that said input signal is above said threshold.

8. The invention of claim 1 wherein said signal processor further includes fourth means for sampling said input signal.

9. The invention of claim 8 wherein said fourth means is a Sample and Hold circuit.

10. The invention of claim 8 wherein said signal processor further includes fifth means for storing multiple samples of said input signal.

11. The invention of claim 10 wherein said fifth means includes a data storage pipeline.

12. The invention of claim 8 wherein said sampling stops a predetermined period after said third means detects that said input signal is above said threshold.

13. The invention of claim 8 wherein said signal processor further includes means for operating in an alternate mode wherein said sampling stops upon receiving a signal from an external source.

14. The invention of claim 10 wherein said signal processor further includes means for outputting said samples to an external computer a predetermined period after said third means detects that said input signal is above said threshold.

15. The invention of claim 1 wherein said signal processor further includes means for converting said input signal to a voltage signal wherein said means is located in an interior of said array.

16. The invention of claim 15 wherein said means for converting said input signal to a voltage signal is a transimpedance preamplifier.

17. A method for internal bias adjustment of detectors in a ladar focal plane array including the steps of:
   receiving an input signal using a detector element located in an interior of said array;
   generating an adaptive threshold setting based on a characteristic of said input signal; and
   detecting when said input signal is above said threshold, wherein said threshold generation and detection is implemented through electronics located on a periphery of said array.

* * * * *

UNITED STATES PATENT AND TRADEMARK OFFICE
CERTIFICATE OF CORRECTION

PATENT NO.    : 6,522,396 B1                                          Page 1 of 1
DATED         : February 18, 2003
INVENTOR(S)   : Maurice J. Halmos It is certified that error appears in the above-identified patent and that said Letters Patent is hereby corrected as shown below:

Drawings,
Sheet 1, Fig. 2, replace reference numeral "31" with -- 33 --
Sheet 1, Fig. 2, replace reference numeral "4" with -- 44 --
Sheet 1, Fig. 2, replace reference numeral "6" with -- 64 --
Sheet 2, Fig. 3, replace reference numeral "5" with -- 52 --
Sheet 2, Fig. 3, replace reference numeral "9" with -- 90 --
Sheet 2, Fig. 3, replace reference numeral "7" (High Pass Filter) with -- 70 --
Sheet 2, Fig. 3, replace reference numeral "7" (Comparator) with -- 74 --

Column 3,
Line 31, replace reference numeral "31" with -- 33 --

Column 4,
Line 14, replace reference numeral "31" with -- 33 --

Signed and Sealed this

Twentieth Day of April, 2004

JON W. DUDAS
*Acting Director of the United States Patent and Trademark Office*